United States Patent [19]

Hoffmann

[11] Patent Number: 5,328,316
[45] Date of Patent: Jul. 12, 1994

[54] AUTOMATIC STORAGE AND RETRIEVAL SYSTEM HAVING AN EXTENDIBLE BIN EXTRACTION MECHANISM WITH POP-UP TABS

[76] Inventor: Christopher J. Hoffmann, 857 Colonial Ct., Birmingham, Mich. 48009

[21] Appl. No.: 925,561

[22] Filed: Aug. 4, 1992

[51] Int. Cl.$^5$ .............................................. B65G 1/04
[52] U.S. Cl. .................................. 414/280; 364/478; 414/661; 414/273; 414/277; 414/282; 187/109; 187/94
[58] Field of Search ............... 414/280, 273, 277, 281, 414/282, 286, 659, 660, 661; 364/478; 187/73, 108, 109, 94

[56] References Cited

U.S. PATENT DOCUMENTS

| | | | |
|---|---|---|---|
| 3,883,008 | 5/1975 | Castaldi | 414/280 X |
| 3,993,202 | 11/1976 | Neitzel . | |
| 4,492,504 | 1/1985 | Hainsworth | 414/280 X |
| 4,678,390 | 7/1987 | Bonneton et al. . | |
| 4,690,602 | 9/1987 | Castaldi et al. . | |
| 4,789,054 | 12/1988 | Shore et al. | 414/282 X |
| 4,812,102 | 3/1989 | Smith et al. . | |
| 4,824,311 | 4/1989 | Mims . | |
| 4,846,620 | 7/1989 | Mims . | |
| 4,856,956 | 8/1989 | Zur . | |
| 4,860,133 | 8/1989 | Baranski . | |
| 4,932,828 | 6/1990 | Katae et al. . | |
| 4,984,106 | 1/1991 | Herger et al. . | |
| 5,002,449 | 3/1991 | Kita et al. . | |
| 5,101,387 | 3/1992 | Wanger et al. | 414/277 X |
| 5,207,555 | 5/1993 | Shirai | 414/282 X |

FOREIGN PATENT DOCUMENTS

| | | | |
|---|---|---|---|
| 1756427 | 4/1970 | Fed. Rep. of Germany | 414/280 |
| 91276 | 8/1978 | Japan | 414/280 |
| 144206 | 7/1985 | Japan | 414/277 |
| 695901 | 11/1979 | U.S.S.R. | 414/280 |

OTHER PUBLICATIONS

Applied Retrieval Technology Brochure pp. 1-8 (Publication date unknown).
White "Window of Opportunity" Brochure (Publication date unknown).
Harnischfeger Engineers, Inc. Brochure. Excell (Publication date unknown).
Automation Article "Inventory Control Soars with Storage and Retrieval System" Apr. 1991.

Primary Examiner—Frank E. Werner
Attorney, Agent, or Firm—Basile and Hanlon

[57] ABSTRACT

A storage and retrieval system includes a plurality of storage bins arranged in spaced fashion. An extraction mechanism is provided to engage an edge of the bin defined by a sidewall and a bottom of the bin for moving the bin with respect to a storage location and a shuttle device. The extraction mechanism is movable along a first path in either direction with respect to a longitudinal axis of an aisle. The extractor mechanism is extendable below the bottom of a bin in a rest position, such as at a storage location. When the extractor mechanism has reached a position adjacent to the outermost end limit of travel, a tab actuating mechanism is engaged to move upwardly extending tabs between an extended position and a retracted position. A shuttle device is movable horizontally and vertically within a vertical plane for carrying the extractor mechanism and a selected bin from a first selected location, such as a storage position or a bin conveyor position, to a second selected location, such as a loading/unloading position.

20 Claims, 5 Drawing Sheets

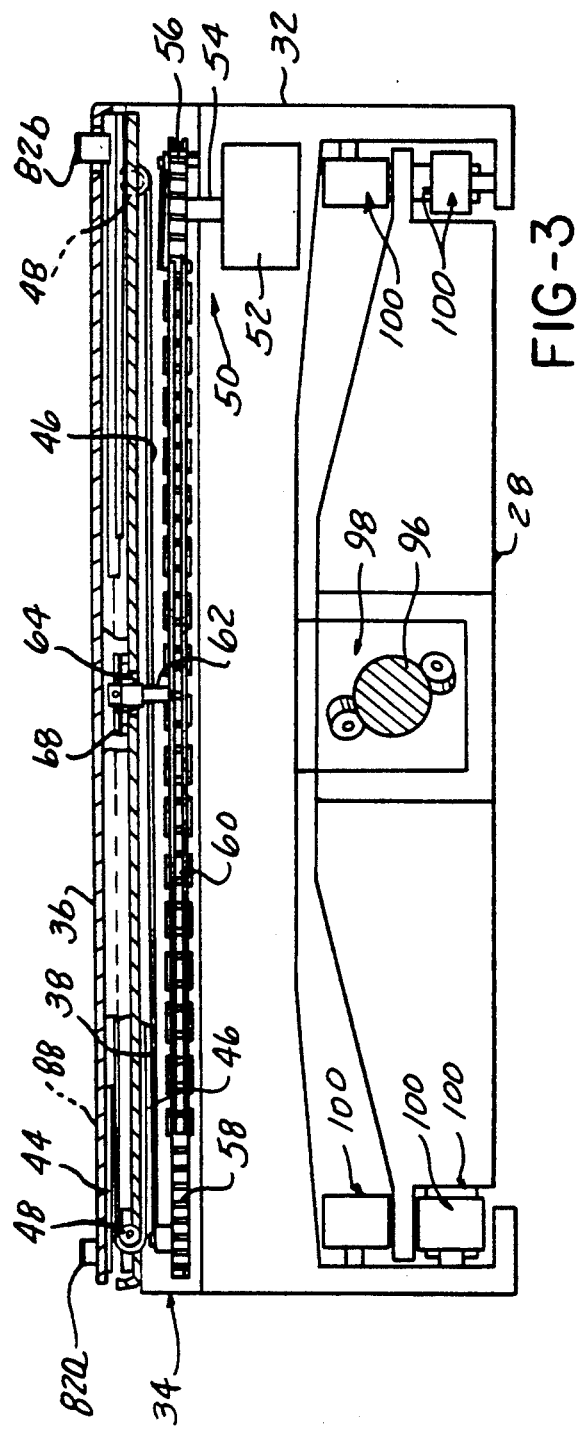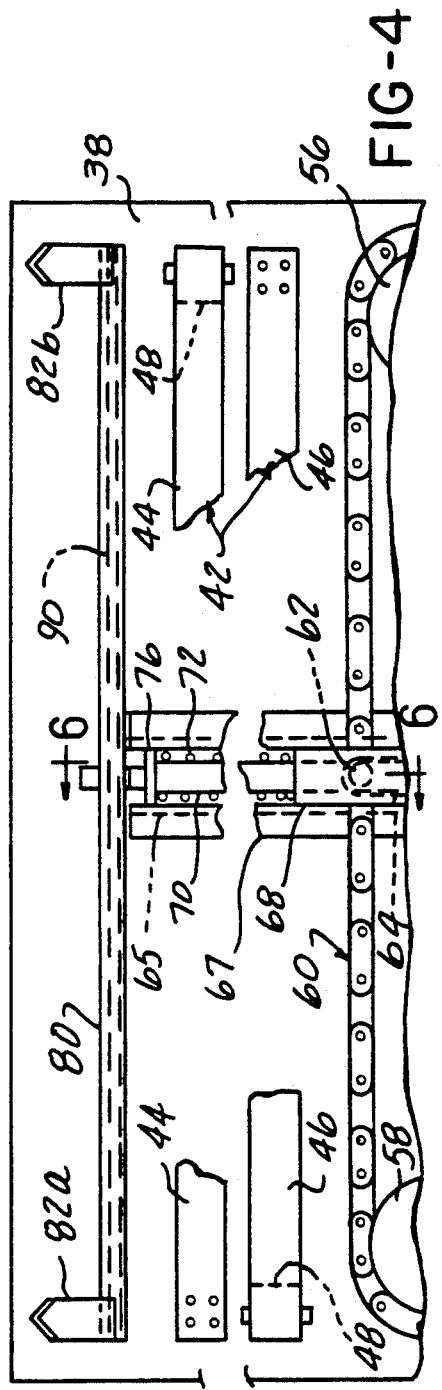

AUTOMATIC STORAGE AND RETRIEVAL SYSTEM HAVING AN EXTENDIBLE BIN EXTRACTION MECHANISM WITH POP-UP TABS

FIELD OF THE INVENTION

The invention relates to container extraction and transfer mechanisms for automated storage and retrieval systems, and more particularly to an extraction and transfer mechanism designed for extraction of modular containers from a first selected location in a storage matrix and transfer into a second selected location.

BACKGROUND OF THE INVENTION

In a conventional automatic storage and retrieval apparatus, two storage areas are formed by vertically and horizontally arranging racks serving as article storage places in the form of a matrix with front surfaces of the article storage places opposed to each other with a predefined space or longitudinal aisle extending therebetween. A vertical column is moved along the front surfaces of the storage areas to introduce or extract articles into or from respective racks of the storage areas by a picker vertically movably provided on the column.

In the aforementioned structure, a vertically extended large column must be driven horizontally in order to move the pickers to a desired rack, whereby considerable power is required causing increasing operating cost. Further, since subsequent introducing or extracting operations cannot be performed until an article is completely introduced into or extracted from a desired rack, introducing or extracting processing takes a great deal of time and is only effected in an inefficient manner. Further, the column and the picker must be connected with a control device for controlling the same by control wires, and hence wiring the installation is difficult.

In the aforementioned conventional automatic storage and retrieval apparatus, a forklift mechanism for picking up a container from the lower side of the container or an extracting arm mechanism formed to be engageable with a fitting portion provided on the front or side surface of the container has been employed as a mechanism of the picker for extracting the container for receiving the article from the storage area onto the picker and returning the same from the picker onto the storage area. However, the forklift mechanism is disadvantageous in space since the containers must be arranged with sufficient intervals in the vertical direction to allow not only lifting of the container from its supports prior to extraction, but also allowing space for a heavy arm section to support the weight, while the extracting arm mechanism is applicable only to specific containers having the fitting portion on the front or side surfaces.

The known automated storage and retrieval systems having in common at least one matrix of storage locations for modular removable containers, tote boxes, or bins, a stacker crane assembly, which moves horizontally along an aisle in front of or between storage locations, a vertically movable platform on the stacker crane assembly, and suitable motors, position sensors, limit switches, and a selected control system to enable positioning the platform at a suitable X-Y coordinate address representing a selected storage location in the storage matrix.

Various types of extraction devices have been proposed in conjunction with the automated storage and retrieval systems. Magnetic extractors have been used to engage a magnetic plate attached to the end of each bin or container. This is adaptable to very light containers, and because of the space occupied by the magnet assembly on the platform, it is suitable only for extraction and subsequent replacement back in the same lateral direction from which the container was extracted. Hook extractors have also been adapted to cooperate with a special handle on the end of the container, by rotating a hook into an upright position inside the inverted L-shaped recess in the handle. The extracted container is removed onto a pair of endless belts which support the container and reduce the strain on the hook. The success of this type of extraction system depends on precise positioning of the handles of the modular containers residing throughout the matrix and misalignment of a particular container may result in faulty engagement of the system. Also a cost penalty is paid as each bin must have a handle welded at each end of the bin.

Another type of extraction system involves insertion of a lifter platform beneath a container, lifting and withdrawing it. This system results in much lost space in the storage matrix, since vertical spacing between container supports must be provided to allow insertion of the lift or shuttle platform and lifting of the container from the supports prior to extraction. The vertical lifting motion also wastes time, making the overall system less efficient. The present invention seeks to reduce and, where possible, eliminate the perceived disadvantages of the conventional automatic storage and retrieval systems including the extractor mechanism.

SUMMARY OF THE INVENTION

The present invention is used in an automatic storage and retrieval system including a plurality of storage compartments arranged longitudinally in vertical rows along an aisle on at least one side of the aisle. A plurality of bins are provided and arranged in spaced fashion in at least one dimensional array in the storage compartments. The storage and retrieval system of the present invention includes extractor means for extracting any selected bin from a selected storage compartment in the at least one dimensional array for delivery to a second selected location or compartment, such as a bin loading and unloading location.

The present invention includes bin manipulating means for extracting, transporting and replacing a selected bin and for movement along any desired path disposed in two perpendicular axes of a horizontal plane and in a vertical plane normal to the horizontal plane. The bin manipulating means defines a generally planar bin supporting surface and carries the extractor means for extension beneath the selected bin, while the selected bin is in a rest position in a storage compartment or loading/unloading location. The present invention also includes pop-up tab means for engaging the selected bin and moving the bin in cooperation with the movement of the extraction means. The pop-up tab means is operable between protruding and withdrawn positions when the extractor means is in an extended position in either direction.

The bin manipulating means of the present invention can include shuttle means for carrying the extractor means. The extractor means can include moveable first and second members disposed generally parallel with respect to one another and extendible along a first path of movement. First roller means are provided for connecting the first member to the second member and for connecting the second member to the shuttle means. Means are also provided for connecting the first member to the shuttle means such that movement of the second member with respect to the shuttle means along the first path of movement in either direction drives the first member in movement along the first path in the same direction. First drive means are provided for driving the second member in reciprocal linear movement along the first path.

The bin manipulating means can also include rail means extending longitudinally along the aisle from one end to the other end for supporting the shuttle in movement along a second path of movement normal to the first path of movement. Second roller means are provided for connecting the shuttle means to the rail means. Second drive means are also provided for moving the shuttle means along the rail means.

The bin manipulator means of the present invention can further include elevator means for raising the shuttle means vertically to a desired location corresponding to the selected storage compartment. The elevator means can include stationary, vertical column means disposed at opposite ends of the aisle for guiding and supporting the shuttle means in vertical movement. Third roller means connect the shuttle means to the column means at each end of the aisle. Third drive means move the shuttle means vertically along the column means. A counter-balance means for counter-balancing the weight of the shuttle means can be provided. The counter-balancing means may include a pulley or sprocket, a cable or chain connected to the shuttle means at one end and a weight guidingly received within a recess within the column means and connected to the cable at an opposite end to the shuttle means. Emergency brake means may also be provided for stopping movement of the shuttle means to prevent uncontrolled vertical movement downward in the case of any emergency or failure of any of the elevator components. The shuttle means may in this configuration be connected to the elevator means through the rail means, such that the rail means are connected to the vertical column means with the third roller means and the third drive means operates to move the rail means carrying the shuttle means vertically along the column means. The counter-balancing means can offset both the weight of the shuttle means and the rail means and the emergency brake means can prevent uncontrolled vertically downward movement of the rail means.

Accurate vertical positioning of the shuttle is best accomplished by reading directly off the shelf the selected bin is sitting on, since cable or chain stretch makes it difficult to read off the motor. This can be done by using optic switches that read reflective tape on the shelf, or by having a piece of the shelf break an optic beam, or by using a proximity switch. Vertical distance is measured by counting the passing shelves, slowing down when close and then stopping at the correct shelf. Horizontal positioning also can be handled in a similar manner if required, such as for applications have two or more vertical rows of bins.

It should be recognized by those skilled in the art, that the shuttle, rail and elevator means may take various forms other than those disclosed in the drawings of the present invention, and that the drawings referred to herein are for illustration purposes and are not to be considered limiting with respect to the scope of the present invention. Other features, advantages and modifications of the present invention will become apparent to those skilled in the art after reading the description of the preferred and alternative embodiments below in conjunction with examination of the drawings.

BRIEF DESCRIPTION OF THE DRAWINGS

In the drawings, like reference numerals refer to like elements throughout the various views wherein:

FIG. 3 is a cross sectional schematic view taken as shown in FIG. 2;

FIG. 4 is a detailed view of a portion of the extractor means of the present invention shown in plan view with various elements removed for clarity, the opposite side of the detail being generally a mirror image of that shown;

DETAILED DESCRIPTION OF THE PREFERRED AND ALTERNATIVE EMBODIMENTS

Figure 1:
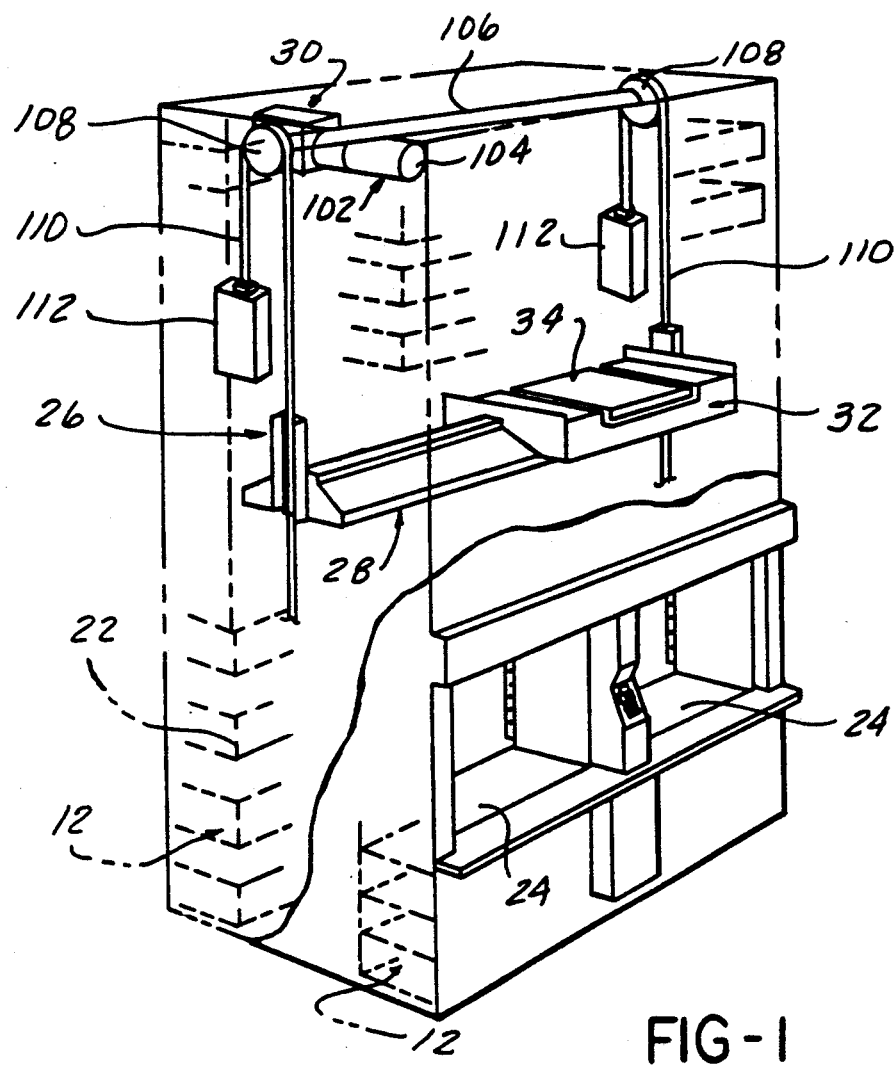
FIG. 1 is a simplified schematic perspective view of the automated storage and retrieval system according to the present invention with numerous parts not shown.

A storage and retrieval system, designated generally as numeral 10, is illustrated schematically in FIG. 1 of the drawings. The automatic storage and retrieval system is used in conjunction with a plurality of predefined storage compartments 12 arranged longitudinally in vertical rows along an aisle 14 on at least one side of the aisle 14. Preferably, the present invention includes storage compartments 12 on both sides of the aisle 14 as illustrated in the plan view depicted in FIG. 2. The framing structure defining the storage compartments 12 are available commercially as modular units, which when assembled define vertically extending open areas between adjacent modular side walls 16 interconnected by a back wall or braces 18. The open vertical area between two adjacent modular side walls 16 is subdivided into predefined storage compartments 12 by placing opposing bin supporting ledges 20 on opposite side walls, such that the ledges 20 define a generally horizontal plane for engaging the bottom of the bin 22 to be supported. The opposing bin supporting ledges 20 may be formed by elongated angled pieces of metal, such as angle iron of sufficient size and dimension to support the weight to be held within the bins 22. It is anticipated, that the present invention would be capable of supporting and transferring bins holding up to, and including, 1000 pounds of weight. Preferably, at least one location in the array of predefined storage compartments 12 is designated as a bin loading and unloading location 24. Depending on the particular application, there may be two or more locations designated as bin loading and unloading areas. In the case of more than one location, one location may be designated as a bin loading location, while the other location is designated as an unloading location, or both locations may be used for either operation at the operator's discretion. In either case, whether designated for a particular function or if capable of selectively performing both functions, at the one location or at a plurality of locations, these areas define the starting or ending points from which the bin manipulating means 26 picks up new bins 22 for storage, or delivers stored bins 22 for removal from the system. Furthermore, one location may be used to interface with outside automation equipment, such as conveyors or wheeled vehicles.

Depending on the size and weight of the bins to be manipulated, the present invention can accommodate a wide variety of configurations. The two-dimensional storage array is preferably at least two storage compartments wide. The overall length of the aisle 14 is limited by the twisting moment imparted to the rail means 28 during the extraction, transportation and replacement of the bins in the selected locations. As can best be seen in FIG. 1, elevator means 30 is provided for lifting the rail means 28 vertically to a desired elevation corresponding to the X-Y coordinate of the desired storage compartment 12. Shuttle means 32 is supported on the rail means 28 for reciprocating movement along the longitudinal axis of the rail means corresponding to the longitudinal axis of the aisle. This provides horizontal movement in conjunction with the vertical movement of the elevator means to reach any desired storage compartment 12 within the storage array. The shuttle means 32, elevator means 30 and rail means 28 may be used in any desired combination depending on the particular application. The preferred embodiment of the present application includes the shuttle, rail and elevator means to provide bin movement along any desired path disposed in two perpendicular axes of a horizontal plane and in a vertical plane normal to the horizontal plane. This preferred configuration of the bin manipulating means 26 includes a bin supporting surface 88 and bin extractor means 34 extendible beneath the selected bin 22, while the selected bin 22 is at rest at a loading/unloading location 24 or in a storage compartment 12. This configuration of the present invention includes pop-up tab means for engaging the selected bin and for moving the selected bin with the extractor means. The pop-up tab means is operable when the extractor means is in an extended position in either direction with respect to the longitudinal axis of the aisle.

Referring now more particularly to FIGS. 3-6, the bin manipulating means includes a bin extractor means 34 for removing and replacing selected bins 22 from selected storage compartments 12. The bin extractor means 34 can include first and second members, 36 and 38 respectively, disposed generally parallel to one another and extendible along a first path of movement. First roller means 40 connect the first member to the second member and also connect the second member to the shuttle means. Means 42 is provided for connecting the first member to the shuttle means such that movement of the second member with respect to the shuttle means along the first path in either direction drives the first member in movement along the first path in the same direction.

Means 42 may include at least two straps, 44 and 46 respectively. Each strap is connected to the first member at one end and connected to the shuttle means at the opposite end. Each strap passes over an idler roller 48 carried by the second member between the ends of the strap. The ends of the two straps are connected at opposite ends of the first member and the shuttle means. The respective idler rollers for each strap are connected adjacent to the respective end of the second member opposite from the end of the strap connection to the first member and the shuttle means, such that the strap is of approximately twice the length of the second member as best seen in FIG. 4 of the drawings.

First reversible drive means 50 drives the second member in controlled reciprocal linear movement along the first path of movement for extension in either direction with respect to the longitudinal axis of the aisle. The first drive means may include a reversible electric motor 52 carried by the shuttle means adjacent one end and having a driven shaft 54 connected to a driven sprocket 56. An idler sprocket 58 is carried by the shuttle means adjacent an opposite end with respect to the driven sprocket. A loop of belt or chain 60 interconnects the driven and idler sprockets. A drive pin 62 extends upwardly from the chain or belt 60 and passes through an elongated slot 64 formed in the second member and engages block 68, preferably through a bushing. Block 68 is slidably retained within a groove 65 defined by keeper 67 fixedly attached to the second member 38. Slot 64 is elongated in a direction generally transverse to the chain 60 and of sufficient size to allow the drive pin 62 to pass around the circumference of the driven and idler sprockets. As the second member is driven in either direction by engagement between the tab drive block 68 and the keeper 67, the first member is driven in the same direction by at least one strap being simultaneously lengthened below the second member and shortened above the second member thereby pulling the first member in the same direction as the second member is driven.

After passing through the slot in the second member, the drive pin is engaged within a recess 66 in an elongated tab drive block 68. The tab drive block 68 includes a longitudinally extending through bore adapted to slidingly receive a tab actuation rod 70 therethrough. The tab actuation rod is carried by the tab drive block. The tab drive block is driven in movement corresponding to the configuration of the chain loop by the drive pin. The tab actuation rod is driven in movement by compression of one of two springs, 72 and 74 respectively, disposed on either side of the tab drive block. Each spring is seated against one side of the tab drive block, while the opposite end of each spring engages an enlarged shoulder 76 formed adjacent the outer ends of the tab actuation rod. A notch 78 is formed between each outer end of the tab actuation rod and the respective enlarged shoulder. A tab connecting shaft 80 carries two tabs, 82a and 82b respectively, and extends from one end of the first member to the opposite end of the first member. One of the two tabs 82a and 82b is disposed adjacent each end of the connecting shaft 80. The tabs 82a and 82b are moveable between two angular positions by rotation of the connecting shaft. The first position 84 of the tabs is a retracted position beneath the first member and the second position 86 is protruding upwardly from the top surface of the first member for engagement with the front or rear surface of a selected bin for pushing or pulling movement of the bin with respect to a support surface 88 formed on the shuttle means. Bin guides or bin retaining members 120 are formed on the outer edges of the shuttle means to guide the bin 22 during extraction and replacement of the bin with respect to a storage location and to retain the bin on the shuttle means during shuttle movement along the rail means.

Figure 6:
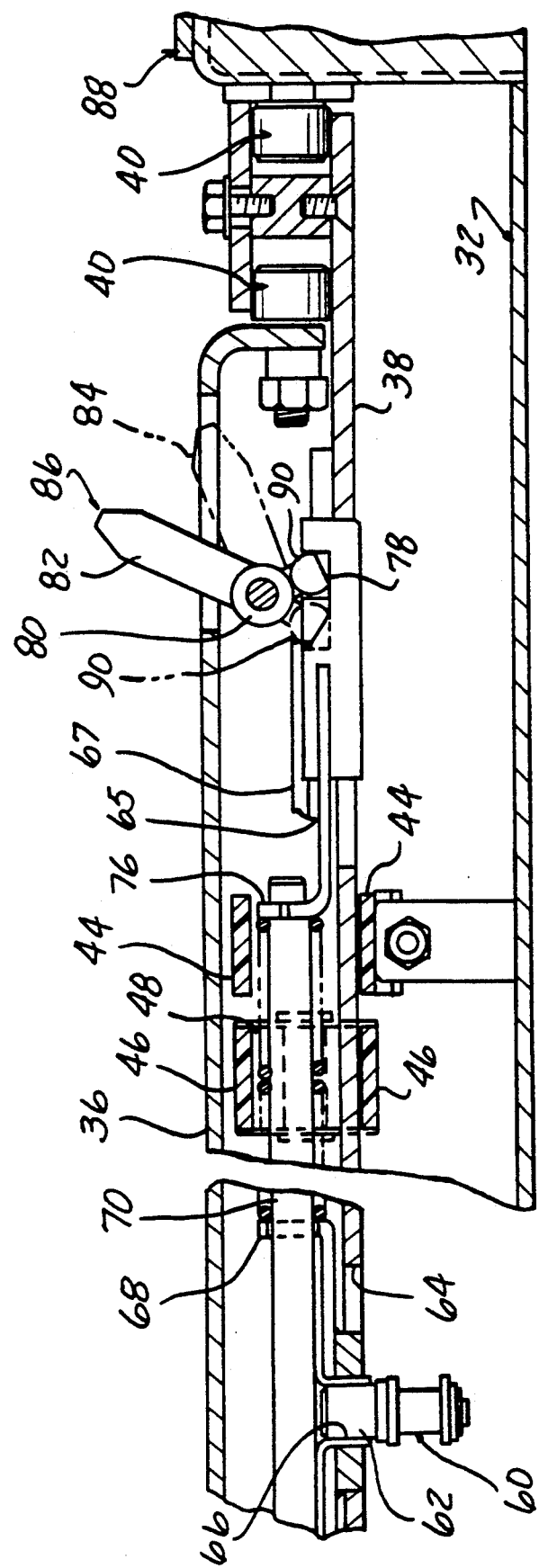
FIG. 6 is a detailed cross sectional view of the bin extractor mechanism taken as shown in FIG. 4.

As best seen in FIG. 6, the support surface 88 is slightly raised above the first member 36. Therefore, the first member 36 does not lift or support the weight of the bin 22. The first member 36 drivingly engages, or drags the bin 22 through contact of one of the pair of tabs, 82a and 82b respectively, with either the front or rear surface of the bin for transferring pushing or pulling movement of the first member 36 to the bin to push the bin 22 from the support surface 88 into a selected storage compartment 12, or to pull the bin 22 from a selected storage compartment 12 onto the support surface 88 formed on the shuttle means 32. The tab connecting shaft 80 includes a protruding portion 90 extending along the longitudinal length of the connecting shaft 80 and engaged within the notch 78 of the actuation rod 70, so that the notch slidingly engages the protruding portion of the connecting shaft along the longitudinal length thereof as the tab actuating rod 70 is carried around the sprockets by the tab drive block. The tab drive block, tab actuating rod, tab connecting shaft and protruding portion defining tab actuation means for operably moving at least two tabs disposed at opposite ends of the first member between a first retracted position beneath the upper surface of the first member and a second extended position above the upper surface of the first member.

As the chain or belt 60 is driven around the sprockets, 56 and 58, the drive pin passes from one side of the sprockets, 56 and 58 respectively, to the other side, which slidingly moves the tab drive block 68 longitudinally along the tab actuation rod 70 to compress one of the two springs, 72 and 74 respectively, against the enlarged shoulder 76. The compressed spring, either 72 or 74, urges the respective enlarged shoulder 76 outwardly causing the protruding portion 90 engaged within the notch 78 to move from one of the first and second positions to the other, so that all four tabs 82 are simultaneously positioned in either the retracted position 84 or the extended position 86. The position of the tabs 82 can be reversed by driving the tab drive block 68 in the opposite direction around the same sprocket to the other side of the plane defined by the two longitudinal, rotational axes of the driven sprocket 56 and idler sprocket 58. The tabs are therefore only operable between the extended and retracted positions when the first member is in the fully extended position in either direction.

It should be apparent from this description, that when the drive pin 62 is in a central location centered between the driven sprocket 56 and the idler sprocket 58, that the first and second members 36 and 38 are centered with respect to the longitudinal axis of the aisle 14. Driving the first reversible drive means 50 in a clockwise direction will extend the first and second members, 36 and 38, in a first direction with respect to the vertical plane containing the longitudinal axis of the aisle 42, while driving the first reversible drive means 50 in a second direction opposite to the first direction will extend the first and second members 36 and 38 in the opposite direction with respect to the vertical plane containing the longitudinal axis of the aisle 14. As the drive pin 62 engaged in the tab drive block 68 moves the second member 38 in linear motion in either direction, one of the two pair of strap means is lengthened below the second member 38 while the other of the two pair of strap means 42 is shortened below the second member 38. The respective lengthening and shortening of the pairs of strap members below the second member 38, correspondingly causes a shortening and lengthening respectively of the portion of the strap means above the second member 38 to cause corresponding movement of the first member 36 in the same direction of movement as the second member 38, while extending the first member 36 outwardly beyond the edge of the second member 38.

In the fully extended position in either direction, the second member extends generally to a position slightly more than halfway beneath the selected bin, while the first member extends slightly beyond the rear edge of the bin disposed in the selected storage compartment. As the drive pin 62 passes around the periphery of one of the sprockets, 56 or 58, the tabs 82 are driven into an extended second position 86 as previously described. This action occurs through an arc of approximately 30° to 45° centered on a plane containing the rotational axes of the driven and idler sprockets, 56 and 58 respectively. The first and second members 36 and 38, are then retracted dragging the bin 22 across the opposing bin supporting ledges 20 onto the supporting surface 88 of the shuttle means 32. When the bin 22 is disposed in a position generally centered on the vertical plane including the longitudinal axis of the aisle 14, the shuttle means 32 is free to move vertically and horizontally within the vertical plane to a second desired location. The drive motor is then driven in the appropriate direction for placement of the bin 22 on the selected side of the aisle 14. One pair of tabs 82 engage an edge of the bin 22 to now push the bin off from the support surface 88 and onto opposing bin supporting ledges 20 corresponding to the new selected location. As the drive pin passes around one of the sprockets, 56 and 58, the tabs are driven as described above from the extended position 86 to the retracted position 84 allowing the first and second members 36 and 38 to be withdrawn from beneath the bin now positioned within the selected storage compartment 12. The preferred embodiment of the present invention has been designed to require only a two-inch vertical spacing between vertically adjacent bins. The bin extractor means 34 of the present invention has a very low profile of approximately 1½ inches. This provides a ¼ inch clearance above and below the extractor for insertion and retraction of the first and second members between the vertically adjacent bins.

Figure 2:
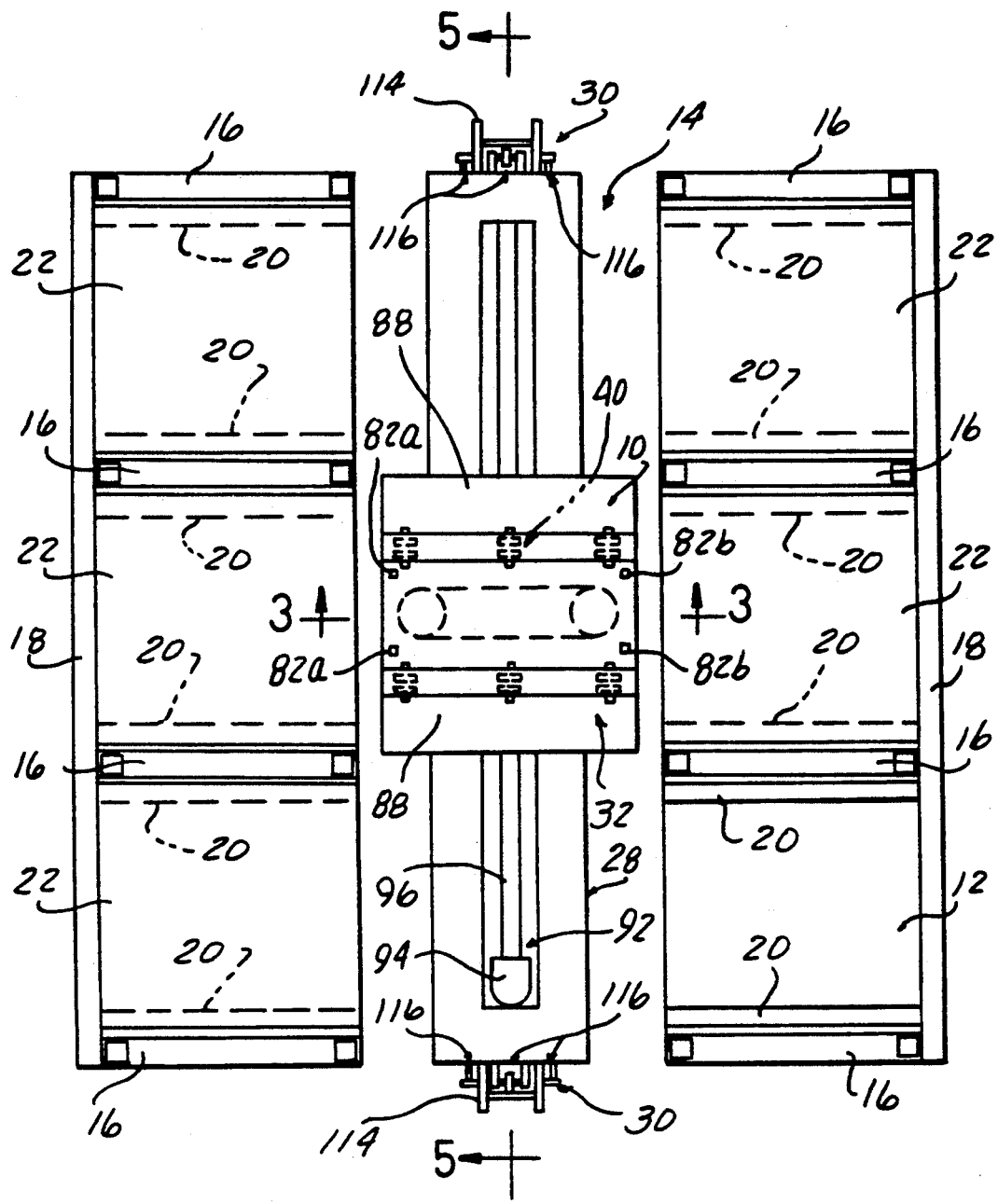
FIG. 2 is a plan view of the bin manipulating means for extracting, transporting and replacing a selected bin from a selected storage compartment on either side of an aisle.
Figure 5:
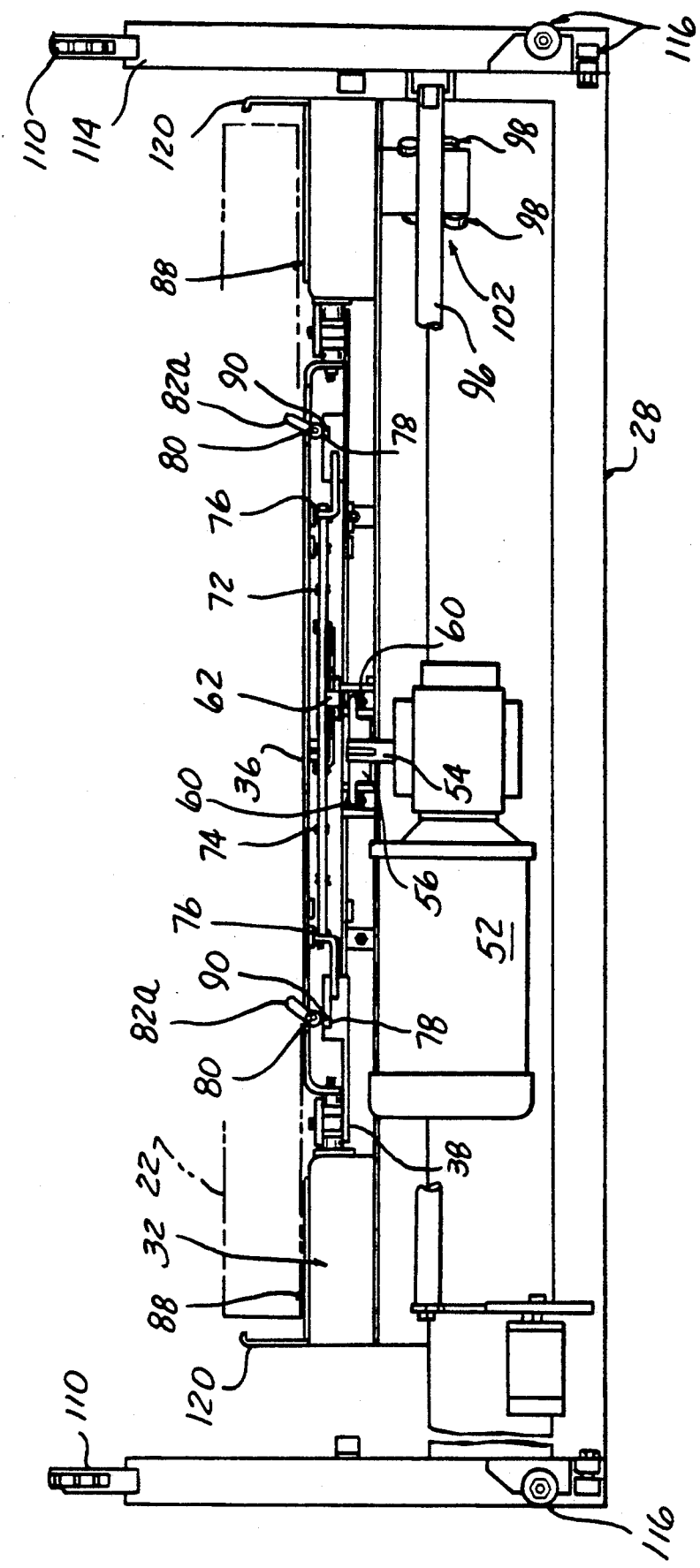
FIG. 5 is a cross sectional schematic view of the bin manipulating means taken as shown in FIG. 2.

Referring now to FIGS. 2, 3 and 5, the rail means 28 preferably includes second reversible drive means 92 for driving the shuttle means 32 in reciprocal linear motion along the longitudinal axis of the aisle 14. The second reversible drive means 92 can include a second reversible electric motor 94 for driving a rotatable shaft 96 in clockwise or counter-clockwise rotation about a longitudinal axis. In one configuration, the longitudinal axis of the rotatable shaft 96 can generally be disposed along a predetermined length of the longitudinal axis of the aisle 14. Roller drive means 98 are connected to the shuttle means 32 and engage the rotatable shaft 96 for driving the shuttle means 32 in either direction with respect to the longitudinal axis of the rotatable shaft 96 in response to rotation of the shaft. The shuttle means 32 is carried on the rail means 28 by second roller means 100 for guidingly supporting and connecting the shuttle means 32 to the rail means 28 for movement along the longitudinal axis of the aisle 14. It has been found that it is desirable to enlarge the horizontal width of the rail means 28 to strengthen the bin manipulating means 26 with respect to the twisting forces encountered when dragging or pushing a bin 22 onto or off from the shuttle means 32 respectively. It has also been found that this configuration of the second reversible drive means 92 can create a higher noise level than that desired during operation of the bin manipulating means 26. Therefore, an alternative and preferred configuration of the second reversible drive means 92 can include the rotatable shaft 96 driving a driven sprocket, with belt or chain loop means passing around the driven sprocket and an idler sprocket to drivingly support a drive pin disposed within an elongated slot formed in the shuttle means 32 similar to that disclosed and described with respect to the drive for the second member 38 with respect to the shuttle means 32. Of course, the additional structure defining means for driving the first member 36 and means for extending and for retracting tabs 82 would not be required for driving the shuttle means 32 with respect to the rail means 28. It is anticipated that this configuration would operate at reduced noise levels and can be manufactured and assembled at a cost less than that required to provide the previously described configuration.

Referring now to FIGS. 1 and 2, elevator means 30 may include a third reversible drive means 102 for lifting the shuttle means 32 or the combination of the rail means 28 and shuttle means 32 vertically to a desired location to position the shuttle means 32 in a predetermined position corresponding to the X-Y coordinate in the vertical plane corresponding to the desired storage compartment 12 for holding the selected bin 22. The third reversible drive means 102 may include a third reversible electric motor 104 for driving a rotatable shaft 106 selectively in clockwise and counter-clockwise directions. The rotatable shaft 106 is connected to a sprocket or pulley 108 at each end. A cable 110 or other similar device, such as a chain or belt, is connected to the rail means 28 at one end passes over the sprocket or pulley 108 and is connected to a counterbalance weight 112 to offset or equalize the weight of the shuttle means 32, or the weight of the combination of the rail means 28 and the shuttle means 32. In addition, the counter-weight may also be sized to offset a portion, or all of the anticipated load to be carried by the shuttle means 32, possibly including the weight of the bin 22. The counter-balance weight 112 may be received within a recess formed within or adjacent to stationary vertical column means 114 disposed at opposite ends of a predetermined length of the aisle 14. Third roller means 116 connect the rail means 28 for guided vertical movement. Emergency brake means (not shown) may be provided for stopping movement of the shuttle means 32 vertically downward with respect to the column means 114 to prevent uncontrolled movement of the rail means 28 downwardly along the column means 114 due to a failure of any components of the elevator means 30.

The present invention discloses a bin manipulating mechanism, and in particular a bin extraction mechanism which can engage an edge defined by a sidewall of the bin and the bottom surface of the bin. The present invention reduces the amount of vertical spacing between vertically adjacent bins by eliminating the need to lift a bin prior to extraction or placement of the bin within the storage location. In addition, the present invention eliminates the need for specially designed bins having complementary engagement apertures on a predefined surface of the bin, such as the devices requiring handles on the front surfaces of bins, or apertures within the side surfaces of the bin in order to accomplish extraction of the bin from the storage locations.

Figure 7:
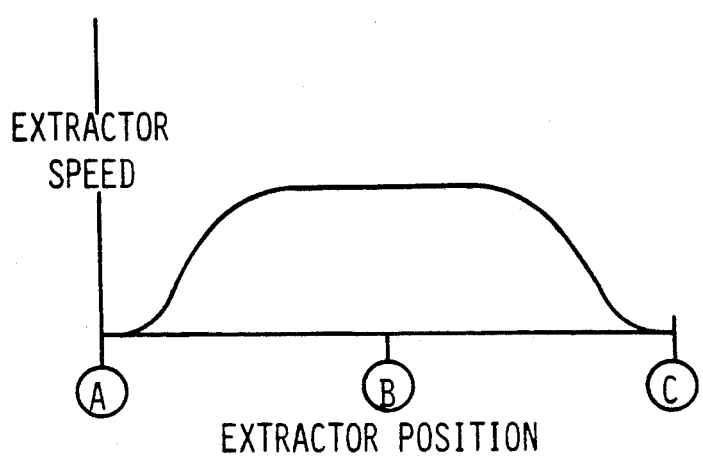
FIG. 7 is a graph showing the relationship of extractor speed with respect to the position of the extractor.

Referring to FIG. 7, the relationship between the extractor speed and position is shown. Position A represents the extractor in a first fully extended position with respect to a longitudinal centerline of the aisle 14. Position B represents the extractor in a home position centered on the longitudinal centerline of the aisle 14. Position C represents the extractor in a second fully extended position in a direction opposite from position A with respect to the longitudinal centerline of the aisle 14. Using the preferred configuration of the drive mechanism for the extractor results in the speed to position relationship as shown in FIG. 7. As illustrated, the extractor mechanism approaches zero speed at each of the first and second fully extended positions as the drive pin carried by the loop means passes around either one of the idler or drive sprockets. It should be recognized that the slope of the speed to position ratio can be altered by providing a smaller sprocket to increase the slope or a larger sprocket to decrease the slope of the transition between zero to maximum extractor speed. Of course, the maximum sprocket size would be limited as a function of the available space on the shuttle means and the size of the extractor mechanism.

While the invention has been described in connection with what is presently considered to be the most practical and preferred embodiment and alternative embodiments presently contemplated, it is to be understood that the invention is not to be limited to the disclosed embodiments, but on the contrary, is intended to cover various modifications and equivalent arrangements included within the scope and spirit of the appended claims, which scope is to be accorded the broadest interpretation so as to encompass all such modifications and equivalent structures as permitted under current law.

What is claimed is:

1. A storage and retrieval system including storage compartments having spaced bin support means, the storage compartments arranged in at least one row for storing a plurality of bins arranged in spaced fashion, each bin having a sidewall and a bottom joined to one another by an edge, the system comprising:

bin manipulator means for transporting a selected bin in movement along a desired path disposed in at least one of two perpendicular axes of a vertical plane, said bin manipulating means including extractor means for extracting the selected bin from a selected storage compartment, said extractor means extendible from a retracted position along a first axis to an extended position beneath and between said spaced bin support means of said selected storage compartment, and pop-up tab means carried by said extractor means and retractably extendible from said extractor means when said extractor means is in the extended position for engaging a remote sidewall adjacent said edge of the selected bin to move said selected bin from said selected storage compartment onto said bin manipulator means as said extractor means moves from said extended position to said retracted position.

2. The system of claim 1 wherein the extractor means further comprises:

shuttle means for carrying said extractor means and having a bin supporting surface;

first and second generally planar movable members, said first and second members disposed generally parallel with respect to one another and extendible along the first axis;

first roller means for connecting the first member to the second member and for connecting the second member to the shuttle means for movement along the first axis; and means for connecting the first member to the shuttle means, such that movement of the second member with respect to the shuttle means along the first axis in either direction drives the first member in movement along the first axis in the same direction.

3. The system of claim 1 further comprising:

single drive means for driving the extractor means in controlled movement along the first axis for operably actuating the pop-up tab means, said single drive means including a reversible electric motor carried by the shuttle means adjacent one end and having a driven shaft connected to a driven sprocket, an idler sprocket carried by the shuttle means adjacent an opposite end with respect to the driven sprocket, loop means for interconnecting the driven and idler sprockets, the loop means carrying a drive pin extending upwardly therefrom for engagement through an elongated slot formed in the first member, the elongated slot disposed in a direction generally transverse to the loop means and of sufficient size to allow the drive pin to pass around a circumference of the driven sprocket and the idler sprocket; and the pop-up tab means including a drive block having a recess and a longitudinally extending through bore, the drive pin engaged within the recess, a rod slidingly engaged through the longitudinally extending through bore and having first and second ends, each of the first and second ends having an enlarged shoulder formed adjacent the end and a notch formed between the end and the respective enlarged shoulder, a spring disposed between each end of the drive block and the respective enlarged shoulder, a connecting shaft supporting at least one pair of tabs with one tab adjacent each end of the connecting shaft, the connecting shaft having a protruding portion extending along the longitudinal length thereof and engaged within the notch of the rod, wherein rotation of the first electric motor in a first direction drives the extractor means in a first direction along the first axis to a fully extended position and at an outermost limit of travel drives the drive block in a direction generally transverse to the first axis as the drive pin passes around a portion of the circumference of one of the sprockets to actuate the tabs between the extended and retracted positions.

4. A storage and retrieval system including storage compartments having spaced bin support means, said storage compartments arranged longitudinally in vertical rows along an aisle for storing a plurality of bins arranged in spaced fashion in at least one vertically and longitudinally extending two-dimensional array, each bin having a sidewall and a bottom joined to one another by an edge, the system comprising:

bin manipulator means for transporting a selected bin in movement along a desired path disposed in two perpendicular axes of a vertical plane, said bin manipulating means including extractor means for extracting the selected bin from a selected storage compartment in said at least one two-dimensional array, said extractor means extendible from a retracted position along a first horizontal axis normal to the vertical plane to an extended position beneath and between said spaced bin support means of said selected storage compartment, and pop-up tab means carried by said extractor means and retractably extendible from said extractor means when said extractor means is in the extended position for engaging a remote sidewall adjacent said edge of the selected bin to move said selected bin from said selected storage compartment onto said bin manipulator means as said extractor means moves from said extended position to said retracted position.

5. The system of claim 4 wherein said bin manipulator means further comprises:

shuttle means for carrying said extractor means;

said extractor means including first and second generally planar moveable members, said first and second members disposed generally parallel with respect to one another, first roller means for connecting said first member to said second member and for connecting said second member to said shuttle means for movement along said first horizontal axis between the extended position and the retracted position, means for connecting the first member to the shuttle means such that movement of the second member with respect to the shuttle means along said first horizontal axis in either direction drives the first member in movement along the first horizontal axis in the same direction, and first drive means for selectively driving the second member in reciprocal movement along the first horizontal axis and for actuating said pop-up tab means when said second member is in the extended position.

6. The system of claim 4 wherein said bin manipulator means further comprises:

shuttle means for carrying said extractor means;

rail means extending longitudinally along said aisle for a predetermined distance from one end to another end for supporting said shuttle means in movement along a second horizontal axis normal to said first horizontal axis, said second horizontal axis disposed in said vertical plane;

second roller means for connecting said shuttle means to said rail means for movement along said second horizontal axis; and second drive means for selectively moving said shuttle means along said rail means.

7. The system of claim 4 wherein said bin manipulator means further comprises:

shuttle means for carrying said extractor means; and elevator means for raising said shuttle means vertically to a desired location.

8. The system of claim 7 wherein said elevator means further comprises:

stationary vertical column means disposed at opposite ends of said aisle for guiding said shuttle means in vertical movement;

third roller means for connecting said shuttle means to said column means at each end of said aisle for vertical movement; and third drive means for moving said shuttle means vertically with respect to said column means to a desired elevation corresponding to a selected storage compartment.

9. The system of claim 8 further comprising:

counter-balance means for counter-balancing a weight of the shuttle means including a pulley, a cable connected to said shuttle means at one end and a weight guidingly received within a recess of said column means and connected to said cable at an end opposite to said shuttle means.

10. The system of claim 9 further comprising emergency brake means for stopping movement of the shuttle means to prevent uncontrolled movement vertically downward.

11. The system of claim 4 wherein said bin manipulator means further comprises:
 shuttle means for carrying said extractor means;
 said extractor means including first and second generally planar moveable members, said first and second members disposed generally parallel with respect to one another and extendible along a first path of movement;
 first roller means for connecting said first member to said second member and for connecting said second member to said shuttle means;
 means for connecting the first member to the shuttle means such that movement of the second member with respect to the shuttle means along said first path in either direction drives the first member in movement along the first path in the same direction;
 first drive means for driving the second member in reciprocal movement along the first path;
 rail means extending longitudinally along said aisle from one end to another for supporting said shuttle means in movement along a second path normal to said first path;
 second roller means for connecting said shuttle means to said rail means; and
 second drive means for moving said shuttle means along said rail means.

12. The system of claim 11 wherein said bin manipulator means further comprises:
 elevator means for raising said rail means vertically to a desired location.

13. The system of claim 4 wherein said bin manipulator means further comprises:
 shuttle means for carrying said extractor means;
 said extractor means including first and second generally planar moveable members, said first and second members disposed generally parallel with respect to one another and extendible along a first path of movement;
 first roller means for connecting said first member to said second member and for connecting said second member to said shuttle means;
 means for connecting the first member to the shuttle means such that movement of the second member with respect to the shuttle means along said first path in either direction drives the first member in movement along the first path in the same direction;
 first drive means for driving the second member in reciprocal movement along the first path; and
 elevator means for raising said shuttle means vertically to a desired location.

14. The system of claim 13 wherein said bin manipulator means further comprises:
 rail means extending longitudinally along said aisle from one end to another for supporting said shuttle means in movement along a second path normal to said first path;
 second roller means for connecting said shuttle means to said rail means; and
 second drive means for moving said shuttle means along said rail means.

15. A storage and retrieval system comprising:
 a plurality of storage compartments having spaced bin support means, said storage compartments arranged longitudinally in vertical rows on both sides of a longitudinally extending aisle;
 a plurality of bins, each bin having at least one sidewall and a bottom, the at least one sidewall and bottom connected to one another to define an edge, each bin arranged in one of said storage compartments, said plurality of bins defining a two-dimensional array of bins on both sides of the aisle;
 extractor means for extracting a selected bin from a first location and for replacing the selected bin at a second location, said extractor means extendible along a first horizontal axis beneath and between said spaced bin support means of said selected storage compartment;
 shuttle means for transporting a selected bin in movement along a desired path disposed in two perpendicular axes of a vertical plane, said shuttle means carrying said extractor means and having a bin supporting surface spaced vertically above the extractor means;
 at least one pair of tabs carried by said extractor means, said at least one pair of tabs moveable between a retracted position within the extractor means and an extended position extending vertically upwardly from the extractor means for engagement with a remote sidewall adjacent said edge of the selected bin;
 tab actuation means for moving the tabs between the retracted and extended positions; and
 single drive means for driving the extractor means in controlled movement along the first horizontal axis normal to the vertical plane when positioned at a selected position with respect to the selected bin and for operably engaging the tab actuation means for moving the pair of tabs between the extended and retracted positions when the extractor means is in a fully extended position.

16. The system of claim 15 wherein the extractor means further comprises:
 first and second generally planar movable members, said first and second members disposed generally parallel with respect to one another and extendible along the first horizontal axis normal to the vertical plane;
 first roller means for connecting the first member to the second member and for connecting the second member to the shuttle means for movement along the first horizontal axis; and
 means for connecting the first member to the shuttle means, such that movement of the second member with respect to the shuttle means along the first horizontal axis in either direction drives the first member in movement along the first horizontal axis in the same direction.

17. The system of claim 16 further comprising:
 said single drive means including a reversible electric motor carried by the shuttle means adjacent one end and having a driven shaft connected to a driven sprocket, an idler sprocket carried by the shuttle means adjacent an opposite end with respect to the driven sprocket, loop means for interconnecting the driven and idler sprockets, the loop means carrying a drive pin extending upwardly therefrom for engagement through an elongated slot formed in the first member, the elongated slot disposed in a direction generally transverse to the loop means and of sufficient size to allow the drive pin to pass around a circumference of the driven sprocket and the idler sprocket; and the tab actuating means including a drive block having a recess and a longitudinally extending through bore, the drive pin engaged within the recess, a rod slidingly engaged through the longitudinally extending through bore and having first and second ends, each of the first and second ends having an enlarged shoulder formed adjacent the end and a notch formed between the end and the respective enlarged shoulder, a spring disposed between each end of the drive block and the respective enlarged shoulder, a connecting shaft supporting the at least one pair of tabs with one tab adjacent each end of the connecting shaft, the connecting shaft having a protruding portion extending along the longitudinal length thereof and engaged within the notch of the rod, wherein rotation of the first electric motor in a first direction drives the extractor means in a first direction along the first horizontal axis normal to the vertical plane to a fully extended position and at an outermost limit of travel drives the drive block in a direction generally transverse to the first horizontal axis as the drive pin passes around a portion of the circumference of one of the sprockets to actuate the tabs between the extended and retracted positions.

18. The system of claim 15 wherein said shuttle means further comprises:
rail means for carrying said shuttle means in movement along a second horizontal axis extending longitudinally along the aisle for a predetermined distance, the second horizontal axis contained within the vertical plane;
second roller means for connecting the shuttle means to the rail means; and
second drive means for moving the shuttle means along the rail means.

19. The system of claim 15 wherein said shuttle means further comprises elevator means for raising the shuttle means vertically to a desired elevation corresponding to the storage compartment location containing the selected bin.

20. The system of claim 19 wherein said elevator means further comprises:
stationary vertical column means disposed at opposite ends of a predetermined longitudinal distance along the aisle for guiding the shuttle means in vertical movement;
third roller means for connecting the shuttle means to the column means at each end of the aisle; and
third drive means for moving the shuttle means vertically with respect to the column means.

* * * * *